May 21, 1957 W. SCHNEITER 2,792,756
ROCKET LAUNCHING SUPPORT STRUCTURE
Filed May 5, 1953 3 Sheets-Sheet 2
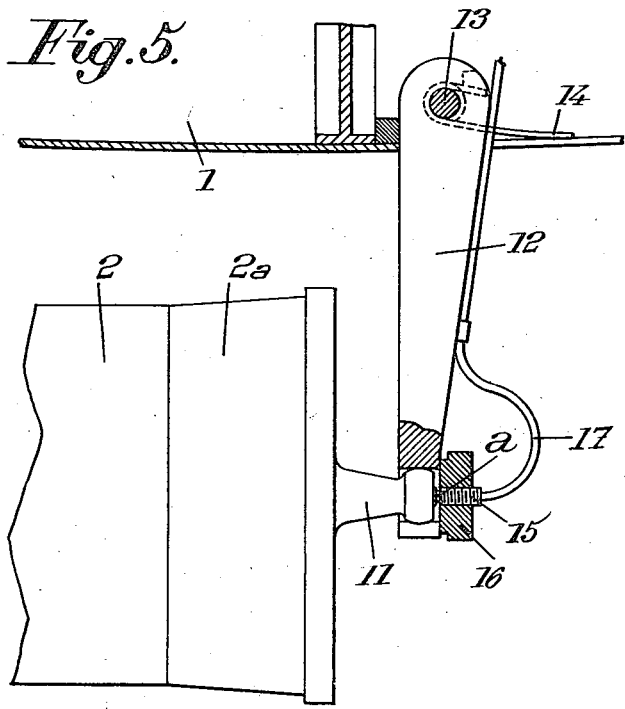
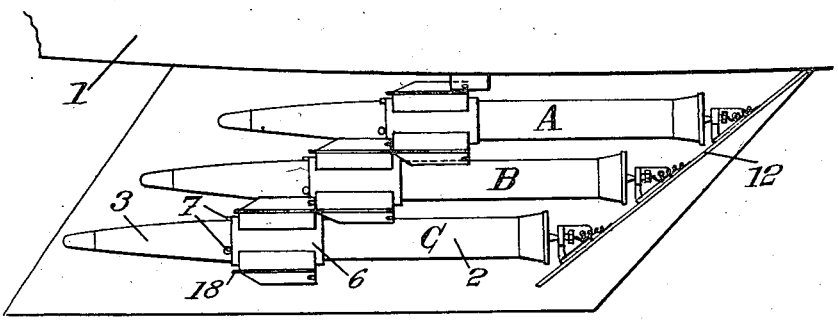
INVENTOR
WERNER SCHNEITER,
BY
Robert B Pearson
ATTORNEY

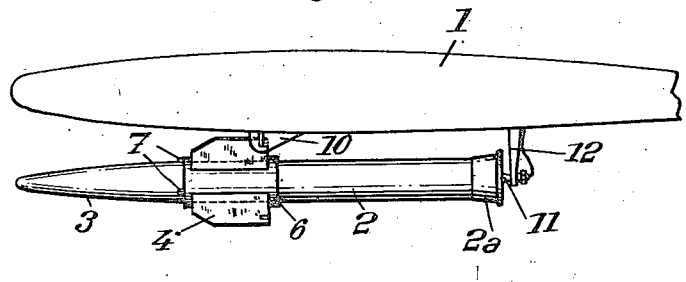
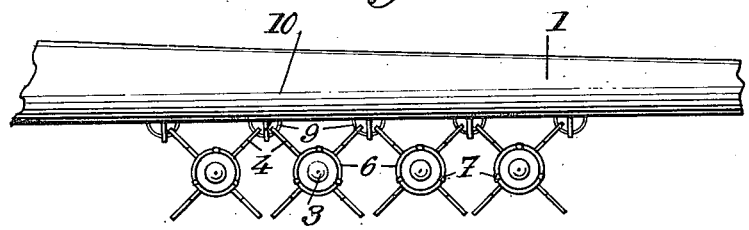
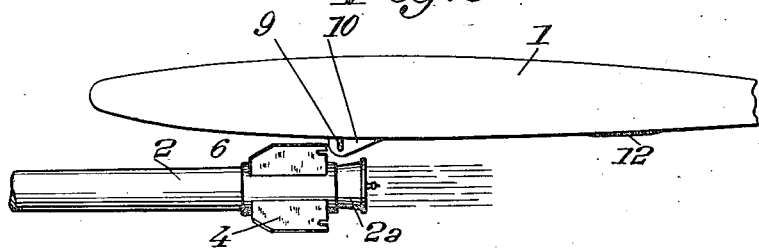
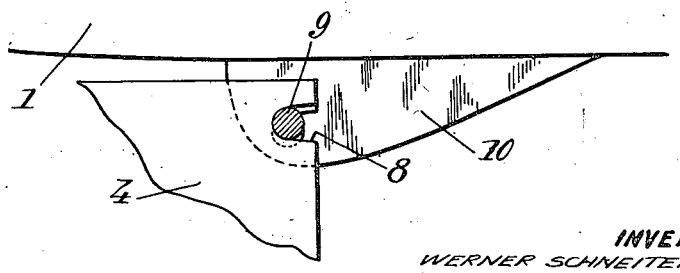

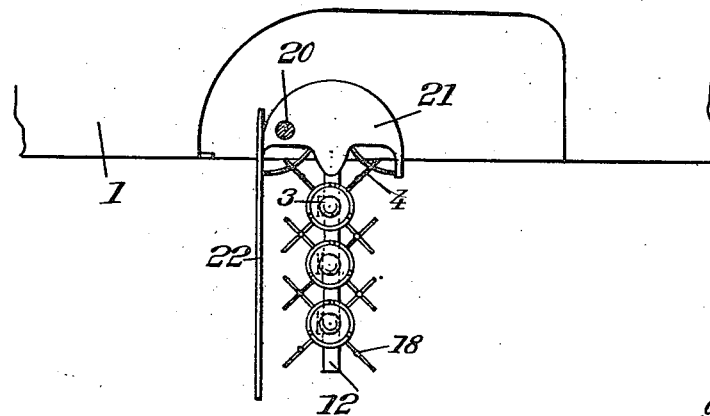
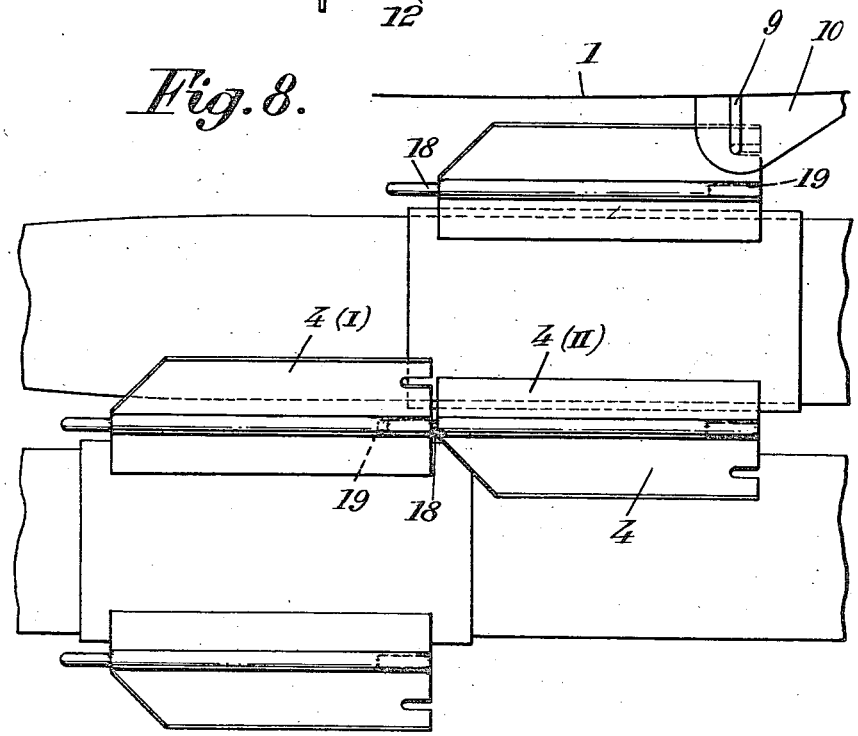

United States Patent Office 2,792,756
Patented May 21, 1957

2,792,756
ROCKET LAUNCHING SUPPORT STRUCTURE

Werner Schneiter, Bern, Switzerland, assignor to Society "Brevin A. G.," Zurich, Switzerland, a society of Switzerland Application May 5, 1953, Serial No. 353,126

Claims priority, application Switzerland May 6, 1952

6 Claims. (Cl. 89—1.7)

The present invention relates to land, sea or air combat machines including at least one rocket held in launching position by a suspension device (as opposed to rockets held in such a position by a launching tube), the expression "combat machine including at least one rocket" covering, in what follows, the combination of the combat machine proper and of the rocket or rockets carried by said machine. My invention is more especially although not exclusively concerned with airplanes provided with hanging rockets, said rockets being generally disposed under the wings of the airplane.

The object of my invention is to provide a machine of this kind which is better adapted to meet the requirements of practice and in particular which increases the accuracy of aiming, the simplicity of suspension and, in the case of airplanes, the aerodynamic qualities of said airplanes after rockets have been launched.

In such machines, the rocket suspended to the machine proper includes a tail unit which is to be located near the rear part of the rocket after the latter has been launched.

According to my invention, this tail unit is slidably mounted on the rocket body and is used, in a forward position thereof, as an element of the rocket suspension system fixed to the machine proper, the rear part of the rocket body being provided with axial holding means capable of driving the tail unit and keeping it in the rear position with respect to the rocket when, after launching thereof, said rear portion of the rocket body comes to engage said tail unit, whereby this tail unit, during the initial period of the rocket launching operation, operates both as a suspension element and as a guiding element for the rocket body.

Preferred embodiments of my invention will be hereinafter described with reference to the accompanying drawings, given merely by way of example, and in which:

Fig. 1 is a diagrammatic side view of an airplane wing under which a plurality of rockets are hung according to the present invention;

Fig. 2 is a front view corresponding to Fig. 1;

Fig. 3 shows the relative positions occupied by the different elements of the system during the launching of a rocket;

Figs. 4 and 5 show, on an enlarged scale, details of the rocket suspension device;

Figs. 6 and 7 show, respectively in side view and in front view, a modification of the arrangement of a plurality of rockets under an airplane wing;

Fig. 8 shows, on an enlarged scale, a detail of the assembly of two rockets.

In the following description, it will be supposed that rockets are hanging under the wing 1 of an airplane.

The airplane proper is of any conventional construction, the only particular feature thereof being that it is provided with means for suspending rockets thereto as it will be hereinafter more specifically described.

Every rocket includes a body 2 of general cylindrical shape including at the front an ogival head 3 in which is housed the charge to be transported, for instance an explosive charge.

Said rocket includes a tail unit including, in the example shown by the drawing, a plurality of fins 4 (for instance four fins) extending radially, and normally this tail unit is located at the rear part of the rocket under normal operation, that is to say when the rocket has been launched and is flying along its trajectory.

According to my invention, the tail unit is slidable with respect to the rocket body 2. For this purpose, as shown by the drawing, the fins 4 of said tail unit are mounted on a tubular member or sleeve 6 mounted with sliding fit on said rocket body 2, any frontward displacement of sleeve 6 with respect to the rocket body 2 being limited by abutment means carried by rocket body 2, for instance by stopping pins 7. I may also give the rear edge of the ogival head 3 of the rocket a diameter exceeding the diameter of the cylindrical body of the rocket by an amount substantially equal to the thickness of sleeve 6.

As shown by the drawing, when the tail unit is located in its front position with respect to the rocket body 2, at least one of the fins 4 of said tail unit serves as an element for hanging the rocket under wing 1. For instance, as shown by Fig. 2, every rocket is hung close to the underside of said wing 1 by two of its fins 4 disposed at 45°.

The rear part 2a of the rocket body 2 is provided with axial holding means capable of carrying the tail unit along and of holding it in rear position with respect to said body (normal working position) when, after the rocket has been fired, said rear part 2a comes into contact with sleeve 6.

Such axial holding means may be constituted, for instance, by giving the rear portion 2a a frusto-conical shape with its apex turned toward the front and rectilinear or curvilinear generatrices, this rear part 2a (behind which may be provided a holding annular projection) coming into contact, when the rocket is starting, with the rear edge of sleeve 6 which is then wedged upon said part 2a and carried along by the rocket body 2.

It should be noted that the engagement of fins 4 on the corresponding elements carried by wing 1 must be made in such manner that said fins are automatically disengaged from said elements by the frontward movement of the tail unit under the action of the axial forces brought into play when conical portion 2a of the rocket body comes into contact with sleeve 6.

Advantageously, as shown by the drawing:

Fins 4 serve as front suspension elements for the rocket body 2, every fin being then provided in its trailing edge, as shown by Fig. 4, with a notch 8 opening toward the rear and capable of surrounding over a semi-circumference the front portion of a suspension rod 9 fixed to wing 1 and to a vertical ridge 10 carried by the wing on the underside thereof.

Means are provided for the suspension of the rear part of the rocket body 2, said means being arranged so as to oppose in the axial direction, to forces which might urge the rocket body frontwardly, a resistance which is substantially lower than the thrust of the rocket propelling system, this resistance being however sufficient to prevent an accidental forward movement of the rocket or an undesired disengagement of a tail unit 4 before the rocket is to be launched.

The rear suspension means of rocket body 2 are advantageously made as shown by the drawing.

The base plug element of the rocket is supported in arm 12 fixed under wing 1. Arm 12 is mounted so that it retracts rearwardly with a pivoting movement about an axis 13, when the rocket body 2 is released. This rearward movement of arm 12 is urged by the aerodynamic pressure of the surrounding air, by the action of the gases flowing out from the rocket, and possibly, as shown by the drawing, by the action of a spring 14.

This base plug element is fixed to arm 12 through fixation means which are sufficiently weak, in the axial direction, to yield when the rocket body 2 is urged frontwardly by the rocket propelling system.

Advantageously, the firing means of the rocket extend along arm 12 so as to enter the rocket body 2 through the base plug 11.

As shown by Fig. 5, the base plug element of the rocket is engaged in a housing provided at the end of arm 12 and it carries a rearward projection constituted by a screw-threaded element 15 extending rearwardly beyond arm 12.

A locking nut 16 is mounted on said threaded element 15 and the tightening of said nut serves to pull rearwardly the whole of rocket body 2 and tail unit 4, thus locking said tail unit on the respective suspension rods 9.

The portion of element 15 located ahead of the screw-thread thereof is made weaker by giving it a smaller cross section diameter at "a," this diameter being chosen in such manner to obtain the desired weaker resistance for the rear fixation of the rocket.

The rocket ignition circuit 17 enters the rocket body 2 through elements 15 which may be insulated and act as an intermediate conductor.

With a system as above described and as shown by Fig. 1 in the position before launching, the rocket launching operation takes place as follows:

As soon as the rocket propelling system is ignited, the rocket body 2 moves frontwardly after breaking of the rear fixation at $a$ and arm 12 is retracted rearwardly; during this initial step of the launching operation, tail unit 4 remains practically stationary with respect to wing 1 due to its inertia. When the frusto-conical part $2a$ of the rocket body comes into engagement with tail unit 4, it wedges into sleeve 6 and carries along with itself said tail unit (position shown by Fig. 3) which is then fixed in its normal axial position with respect to the rocket body 2.

The advantages of using such a rocket fixation on an airplane are especially as follows:

First, the aiming of the rockets is very good due to the guiding supplied during the launching operation by the sliding tail unit, this accuracy of aiming being obtained without making use of launching tubes the weight and drag of which would be detrimental of the aerodynamic performance of the airplane.

On the other hand, once the rockets are launched, the only parts to project from the under face of wing 1 are the hooking elements of small drag.

Finally, this rocket fixation system is particularly simple, it does not include any special retracting mechanism and the setting of the rockets in position can be made very quickly without requiring trained personnel.

In the embodiment of my invention which has just been described, the rockets are hung side by side under the element which supports them, that is to say wing 1, the sliding tail units of said rockets being all fixed directly to said supporting element.

According to the embodiment diagrammatically illustrated by Figs. 6 and 7, several rockets A, B, C of the same kind as above described, that is to say having sliding tail units, are disposed at different levels, said rockets being disposed for instance in a substantially vertical row.

Each of these rockets is fixed by its tail unit on the rocket located immediately above it, the top rocket being directly fixed to the supporting element constituted by wing 1.

If the rockets are successively fired (starting with the lowermost one and so on upwardly), the launching of every rocket takes place in the same manner as above described, the whole of the rockets located above that which is being launched constituting the supporting structure.

Preferably, as above described, the tail units 4 constitute front hanging elements for the rockets, the respective rockets being held at the rear by a common arm 12 to which each of the rockets is fixed axially, for instance by its base plug as above indicated.

The tail unit 4 of every rocket is then hooked to the tail unit of the rocket located immediately above it, whereby the rockets are stepped frontwardly in the downward direction, the common arm 12 being then inclined in the same direction.

Of course when said arm 12 is retractable (either rearwardly or frontwardly), means must be provided for temporarily holding it in the above mentioned inclined position so that it can support the rearward reactions resulting from the launching of the successive rockets.

Concerning the fixation of every tail unit on the tail unit which is located immediately above it, it is arranged in such manner that it makes it possible for the first mentioned tail unit to disengage from the other one by a frontward displacement.

For this purpose and as shown by Fig. 8, every fin 4 is provided respectively on its leading edge and on its trailing edge with complementary elements, one of which is male and the other female, for instance a stud 18 on the leading edge and a sleeve 19 of the same diameter on the trailing edge.

With such an arrangement, in order to engage a fin 4 (I) of the tail unit of a rocket on a fin 4 (II) of the tail unit belonging to the rocket located immediately above and slightly behind it, I engage the pin 18 of fin 4 (II) into the socket of fin 4 (I). Of course, a front displacement of the tail unit to which belongs fin 4 (I) disengages it from the other one.

In order to eliminate the drag resulting from the series of rockets located below one another during the time before the launching operation, said series of rockets may be retractable in wing 1. For this purpose, as shown by Fig. 7, I may pivot on an axis 20, parallel to the firing direction, a support 21 on which is hooked the tail unit of the top rocket, control means being provided to lift or to lower the whole of the series of rockets.

In such cases, I advantageously dispose, parallel to the series of rockets, a panel 22 capable of forming a portion of the underside of wing 1 when said series of rockets is in retracted position.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In combination, a rocket launching support structure, a rocket having a cylindrical body portion and a tail unit including a sleeve slidably mounted on said body portion for longitudinal guiding thereof and a plurality of fins rigid with said sleeve extending outwardly to a distance from the axis of said rocket greater than the maximum radius of the body thereof, cooperating abutment means on said sleeve and said rocket body portion to limit the range of sliding of said sleeve on said body portion between two positions, to wit a front limit position and a rear limit position, said rear limit position being the operative position of said sleeve on said body when said rocket is flying on its trajectory, means for hanging at least one of said fins to said support structure, said hanging means being arranged to prevent rearward movement of said tail unit with respect to said support structure, and being releasable in response to a frontward displacement of said tail unit with respect to said support structure, means for hanging the rear end of said rocket body to said support structure, said last mentioned hanging means being so located on said support structure with respect to said first mentioned hanging means as to hold said rocket body portion in the position thereof where said tail unit is in front limit position with respect thereto, said second mentioned hanging means being adapted to oppose to frontward thrusts applied to said rocket body portion a resistance lower than the thrust exerted by the rocket charge when the rocket is fired, whereby said second mentioned hanging means yield when the rocket is fired.

2. In combination, a rocket launching support structure, a rocket having a cylindrical body portion and a tail unit including a sleeve slidably mounted on said body portion for longitudinal guiding thereof and a plurality of radial fins rigid with said sleeve extending outwardly to a distance from the axis of said rocket greater than the maximum radius of the body thereof, cooperating abutment means on said sleeve and said rocket body portion to limit the range of sliding of said sleeve on said body portion between two positions, to wit a front limit position and a rear limit position, said rear limit position being the operative position of said sleeve on said body when said rocket is flying on its trajectory, means on said support structure for hanging two of said fins to said support structure, said hanging means being arranged to prevent rearward movement of said tail unit with respect to said support structure, and being releasable in response to a frontward displacement of said tail unit with respect to said support structure, and means for hanging the rear end of said rocket body to said support structure, said last mentioned hanging means being so located on said support structure with respect to said first mentioned hanging means as to hold said rocket body portion in the position thereof where said tail unit is in front limit position with respect thereto, said second mentioned hanging means being adapted to oppose to frontward thrusts applied to said rocket body portion a resistance lower than the thrust exerted by the rocket charge when the rocket is fired, whereby said second mentioned hanging means yield when the rocket is fired.

3. A combination according to claim 1 in which said first mentioned hanging means include a rod carried by the under surface of said support structure and transverse to the fore-and-aft direction of said rocket, the trailing edge of said fin which is to be hung to said support structure including a notch adapted to engage the front half of the cross-section outline of said rod.

4. A combination according to claim 1 in which said second mentioned hanging means include an arm carried by the under surface of said support structure and a base plug rigid with said rocket engaged in the end of said arm.

5. A combination according to claim 1 in which said second mentioned hanging means include an arm carried by the under surface of said support structure and a base plug rigid with said rocket engaged in the end of said arm, said arm being retractable against said under surface when the rocket is launched.

6. In combination, a rocket launching support structure, a rocket having a cylindrical body portion and a tail unit including a sleeve slidably mounted on said body portion for longitudinal guiding thereof and a plurality of fins rigid with said sleeve extending outwardly to a distance from the axis of said rocket greater than the maximum radius of the body thereof, cooperating abutment means on said sleeve and said rocket body portion to limit the range of sliding of said sleeve on said body portion between two positions, to wit a front limit position and a rear limit position, said rear limit position being the operative position of said sleeve on said body when said rocket is flying on its trajectory, means for hanging at least one of said fins to said support structure, said hanging means being arranged to prevent rearward movement of said tail unit with respect to said support structure, and being releasable in response to a frontward displacement of said tail unit with respect to said support structure, another rocket located under the first mentioned rocket and substantially parallel thereto, said second mentioned rocket having a cylindrical body portion and a tail unit including a sleeve slidably mounted on said last mentioned body for longitudinal guiding thereof and a plurality of fins rigid with said last mentioned sleeve extending outwardly to a distance from the axis of said second mentioned rocket greater than the maximum radius of the body thereof, cooperating abutment means on said last mentioned sleeve and said last mentioned rocket body portion to limit the range of sliding of said sleeve on said body portion between two positions, to wit a front limit position and a rear limit position, said rear limit position being the operative position of said sleeve on said body when said second mentioned rocket is flying on its trajectory, cooperating means on at least one of said first mentioned fins and at least one of said second mentioned fins for hanging said second mentioned tail unit to said first mentioned tail unit, said last mentioned hanging means being arranged to prevent rearward movement of said second mentioned tail unit with respect to said first mentioned tail unit, and being releasable in response to a frontward displacement of said second mentioned tail unit with respect to said first mentioned tail unit, and means for hanging the rear ends of said rockets to said support structure, said last mentioned hanging means being so located on said support structure as to hold said rocket body portions in the positions thereof where their respective tail units are in front limit positions with respect thereto, said second mentioned hanging means being adapted to oppose to frontward thrusts applied to said rocket body portions a resistance lower than the thrust exerted by each rocket charge when the corresponding rocket is fired, whereby said last mentioned hanging means yield when the corresponding rocket is fired.

References Cited in the file of this patent

UNITED STATES PATENTS

| | | |
|---|---|---|
| 1,879,840 | Brandt | Sept. 27, 1932 |
| 2,344,957 | Anzalone | Mar. 28, 1944 |
| 2,409,210 | Jolly | Oct. 15, 1946 |
| 2,421,752 | Jones | June 10, 1947 |
| 2,451,745 | Jolly | Oct. 19, 1948 |
| 2,591,834 | Kuka | Apr. 8, 1952 |
| 2,630,741 | Robert et al. | Mar. 10, 1953 |

FOREIGN PATENTS

| | | |
|---|---|---|
| 431,590 | Italy | Mar. 2, 1948 |